US008211952B2

(12) United States Patent
Kendra et al.

(10) Patent No.: US 8,211,952 B2
(45) Date of Patent: Jul. 3, 2012

(54) CURABLE SEALING METHOD AND FOAMED COMPOSITION

(75) Inventors: Eli Kendra, Saint Charles, IL (US); Dennis Booth, Grass Lake, MI (US); Paul Snowwhite, Dexter, MI (US)

(73) Assignee: ADCO Products, Inc., Michigan Center, MI (US)

( * ) Notice: Subject to any disclaimer, the term of this patent is extended or adjusted under 35 U.S.C. 154(b) by 426 days.

(21) Appl. No.: 12/377,109

(22) PCT Filed: Aug. 10, 2007

(86) PCT No.: PCT/US2007/075754
§ 371 (c)(1),
(2), (4) Date: Jan. 8, 2010

(87) PCT Pub. No.: WO2008/130425
PCT Pub. Date: Oct. 30, 2008

(65) Prior Publication Data
US 2010/0113628 A1     May 6, 2010

Related U.S. Application Data

(60) Provisional application No. 60/836,768, filed on Aug. 10, 2006.

(51) Int. Cl.
*C08L 53/00* (2006.01)

(52) U.S. Cl. ............ 521/91; 521/96; 521/134; 521/139; 521/148; 522/109; 522/110; 522/111; 522/112; 525/90; 525/314

(58) Field of Classification Search .................. 521/91, 521/96, 134, 139, 148; 522/109, 110, 111, 522/112; 525/90, 314
See application file for complete search history.

(56) References Cited

U.S. PATENT DOCUMENTS

| 5,342,858 | A | * | 8/1994 | Litchholt et al. | ................. 521/98 |
| 6,486,229 | B1 | * | 11/2002 | Hu et al. | .......................... 522/80 |
| 6,579,915 | B2 | * | 6/2003 | Kroll et al. | ..................... 522/109 |
| 6,586,483 | B2 | * | 7/2003 | Kolb et al. | ....................... 521/91 |
| 2007/0155846 | A1 | * | 7/2007 | Muyldermans et al. | ...... 521/134 |

FOREIGN PATENT DOCUMENTS

WO    WO2007/029924    *  3/2007
* cited by examiner

*Primary Examiner* — Irina S Zemel
(74) *Attorney, Agent, or Firm* — Vivacqua Law, PLLC; Raymond J. Vivacqua

(57) ABSTRACT

A foamed composition adapted to seal to a substrate is provided. The foamed composition includes a radiation curable rubber, a photoinitiator, a blowing agent, a styrene-ethylene/butylene block copolymer, a light mineral oil, rheology modifier, a tackifier, and one of a radiation curable monomer and radiation curable oligomer, and wherein the composition is foamed upon application to the substrate.

13 Claims, 1 Drawing Sheet

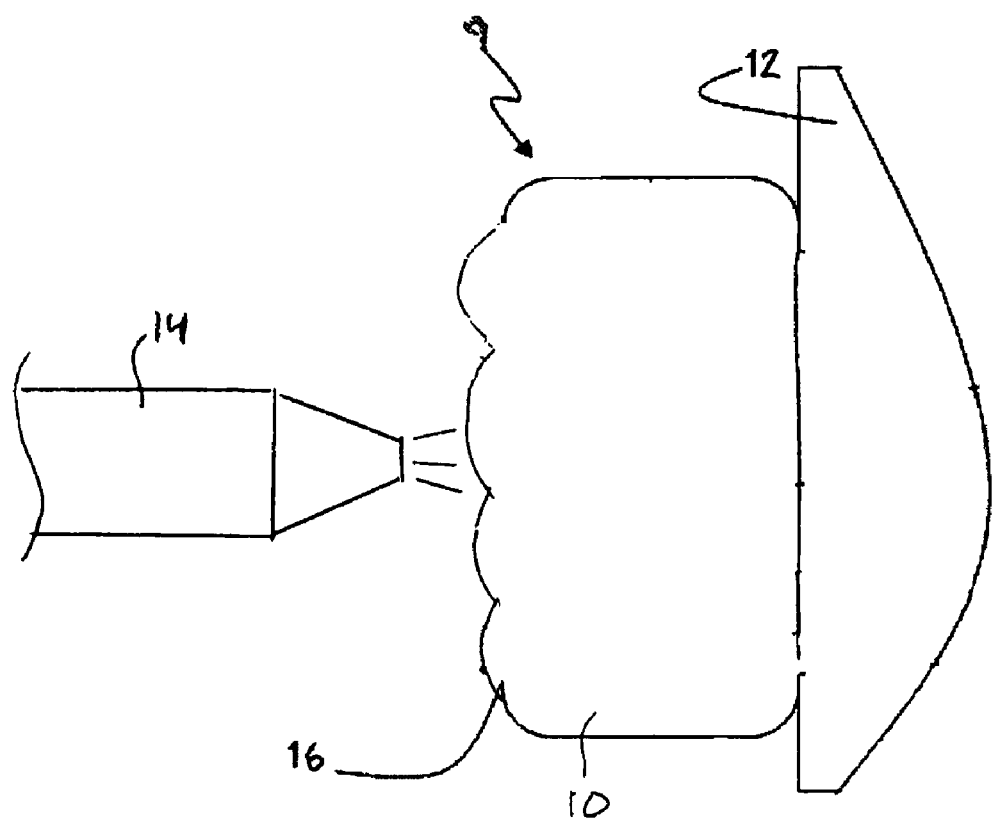

CURABLE SEALING METHOD AND FOAMED COMPOSITION

CROSS-REFERENCE TO RELATED APPLICATIONS

This application claims the benefit of International Application No. PCT/US2007/075754, filed on Aug. 10, 2007, which claims the benefit of U.S. Provisional Application No. 60/836,768, filed on Aug. 10, 2006. The disclosure of the above application is incorporated herein by reference.

FIELD

The present invention relates to a curable sealing method and foamed composition, and more particularly to a curable sealing method and foamed composition for use as a gasketing material in automotive, appliance, and other applications.

BACKGROUND OF THE INVENTION

The statements in this section merely provide background information related to the present disclosure and may or may not constitute prior art.

In various industries, for example the automotive industry and appliance industry, it is known to apply an adhesive or a sealant composition to a product or part during the manufacturing process in order to seal seams, provide structural support, and/or provide vibration damping properties. For example, during the assembly of an automobile, sealants and adhesives are often used within or between the joints between separate components in order to seal the separate components together.

However, the application of traditional sealants and adhesives to parts can be labor intensive and costly to install due to the difficulty in positioning the sealants and adhesives relative to the parts. In addition, traditional sealants currently in use require heating or exposure to moisture after application in order to properly cure and/or seal to a substrate surface on the part. Where such traditional sealants are used in automotive applications, the sealants must be cured by passing the part through an oven to raise the temperature of the sealant and part during the manufacturing process. If the sealant is not properly cured during the manufacturing process, the sealant may not properly seal or adhere to the part to which it has been applied and/or may be smeared onto adjacent surfaces causing contamination and/or an unsightly appearance.

One solution is to provide a composition that expands upon heating to assure a good seal to the substrate, as disclosed in commonly assigned PCT Application No. PCT/US07/75752, entitled "Curable Sealing Method and Foamable Composition". However, oftentimes gaskets and seals are needed on substrates, such as plastics, that are not capable of withstanding high temperatures. Accordingly, there is a need in the art for a curable sealing method and foamed composition which is capable of bonding to substrates and/or sealing seams, which may be cured without the need for heat or moisture, and which is delivered in a form that provides expansion without heating.

SUMMARY OF THE INVENTION

The present invention provides a foamed composition adapted to seal to a substrate.

In one aspect of the present invention, the foamed composition includes a radiation curable rubber, a photoinitiator, a blowing agent, a styrene-ethylene/butylene block copolymer, a light mineral oil, rheology modifier, a tackifier, and one of a radiation curable monomer and radiation curable oligomer, and wherein the composition is foamed upon application to the substrate.

In another aspect of the present invention, the radiation curable rubber comprises a styrene-butadiene-styrene block copolymer.

In still another aspect of the present invention, the radiation curable rubber is curable by ultra-violet radiation.

In still another aspect of the present invention, the blowing agent is nitrogen.

In still another aspect of the present invention, one of the radiation curable monomer and radiation curable oligomer is a polybutadiene diacrylate.

In still another aspect of the present invention, the rheology modifier is fumed silica.

In still another aspect of the present invention, the foamed composition further includes one or more fillers, pigments, antioxidants, and wetting agents.

In another embodiment of the present invention, a foamed composition adapted to seal to a substrate is provided. The foamed composition includes from about 10 to 25% of a radiation curable styrene-butadiene-styrene block copolymer, from about 40 to 75% by weight of a mineral oil, from about 1 to 10% by weight of a tackifier, from about 10 to 25% by weight of a styrene-isoprene-styrene block copolymer, from about 1 to 3% by weight of a fumed silica, from about 0.5 to 1.5% by weight of a photoinitiator, and from about 1 to 3% by weight of a polybutadiene diacrylate.

In yet another embodiment of the present invention, a method for sealing an composition to a substrate is provided. The method includes the steps of mixing a composition with a blowing agent, the composition comprising a radiation curable rubber, a photoinitiator, a blowing agent, a styrene-ethylene/butylene block copolymer, a light mineral oil, a rheology modifier, a tackifier, and one of a radiation curable monomer and radiation curable oligomer, applying the mixed composition and blowing agent to a substrate, and curing the mixed composition and blowing agent with a radiation source after the mixed composition and blowing agent has foamed on the substrate.

In one aspect of the present invention, curing the mixed composition and blowing agent includes curing the mixed composition and blowing agent with ultra-violet radiation.

In another aspect of the present invention, mixing the composition with the blowing agent includes mixing the composition with liquid nitrogen.

BRIEF DESCRIPTION OF THE DRAWINGS

FIG. 1 is a schematic illustration of one embodiment of a curable sealing composition applied to a substrate according to the principles of the present invention.

DETAILED DESCRIPTION OF THE PREFERRED EMBODIMENTS

With reference to FIG. 1, an article or gasket is generally indicated by reference number 9. The article 9 is preferably employed to seal to at least one substrate 12, though more than one substrate 12 may be sealed without departing from the scope of the present invention. As will be described in greater detail below, the article 9 is formulated to foam and expand during application in order to effectively seal to the substrate 12.

The article 9 is comprised of a foamed composition 10 that generally includes a curable rubber component that is a block copolymer with reactive sites for radiation curing. For example, the curable rubber component may comprise a styrene-butadiene-styrene block copolymer. However, other types of curable rubber components may be employed without departing from the scope of the present invention so long as the curable rubber components have the similar curing properties to the styrene-butadiene-styrene block copolymer. The curable rubber component is curable by a radiation source. In a preferred embodiment of the present invention, the radiation source is ultra-violet (UV) light having a wavelength from about 240 to 450 nm. However, it should be appreciated that any radiation source may be employed without departing from the scope of the present invention so long as curing of the rubber component is achievable. A preferred UV curable styrenic block copolymer for use in the present invention is Kraton™ KX222, commercially available from Kraton Polymers. However, it should be appreciated that other rubbery or block copolymer materials may be used in the present invention.

The foamable composition 10 further includes one or more photoinitiators. Suitable photoinitiators for use include, but are not limited to, benzophenones, acetophenone derivatives, such as alpha-hydroxyalkylphenylketones, benzoin alkyl ethers and benzil ketals, monoacylphosphine oxides, and bisacylphosphine oxides. For example, specific photoinitiators include 1-hydroxycyclohexylphenylketone (Irgacure® 184, Ciba Geigy; or Benacure®, Mayzo), Irgacure 819 (bis (2,4,6-trimethylbenzoyl)-phenyl phosphine-oxide, Ciba Geigy), and Genocure CPK (Rahn). Chemical derivatives and combinations of these photoinitiators can also be employed without departing from the scope of the present invention.

The photoinitiator is employed to help control the degree of curing for a given source of radiation. Accordingly, the photoinitiator in the foamable composition is present in an amount sufficient to provide a desired cure speed, good surface and through cure, and a lack of yellowing upon aging.

The foamable composition 10 further includes a styrene-ethylene/butylene block copolymer, a light mineral oil, a tackifier or adhesion promoter, and a UV curable monomer or oligomer such as polybutadiene diacrylate, and a fumed silica.

In one embodiment of the present invention, the foamable composition 10 comprises from about 10 to 25% of the radiation curable styrene-butadiene-styrene block copolymer, from about 40 to 75% by weight mineral oil, from about 1 to 10% by weight of a tackifier, from about 10 to 25% by weight of a styrene-isoprene-styrene block copolymer, from about 1 to 3% by weight of a rheology modifier, from about 0.5 to 1.5% by weight of a photoinitiator, and from about 1 to 3% by weight of the UV curable monomer or oligomer.

Finally, the composition 10 may also include a number of conventional additives including, but not limited to, heat stabilizers, adhesion promoters, colorants including pigments and dyes, fillers, antioxidants, wetting agents, and the like. For example, a preferred heat stabilizer is Irganox 1010, available from Ciba Geigy, and a preferred adhesion promoter is a polyamide resin. The pigment is selected to control a depth of the radiation curing for a given radiation source, and is preferably a black pigment.

In order that the invention may be more readily understood, reference is made to the following example which is intended to illustrate the invention, but not limit the scope thereof:

Foamed Composition

Example 1

| Component | Percent by Weight (%) |
|---|---|
| UV curable SBS rubber[1] | 16 |
| light mineral oil[2] | 58 |
| styrene-isoprene-styrene block copolymer[3] | 16 |
| tackifier[4] | 5.3 |
| photoinitiator[5] | 0.7 |
| fumed silica[6] | 2.2 |
| polybutadiene diacrylate[7] | 1.8 |

[1]Kraton ™ KX222 (Kraton Polymers)
[2]NP-22 (Eastern Oil)
[3]Kraton 1163P (Kraton Polymers)
[4]Eastotac H100-W (Eastman Chemical)
[5]Irgacure 819 (Ciba Geigy)
[6]Aerosil 200 (Degussa)
[7]Sartomer CN307 (Sartomer)

The foamed composition 10 is preferably prepared by mixing all of the components using a C-blade or Sigma blade mixer, though other methods of mixing the components may be employed. Then, the foamed composition 10 is preferably applied to the substrate 12 in a foamed melt (or heated) state, for example between 150 and 350 degrees Fahrenheit, by an applicator 14 using a foaming method. One foaming method includes using a foam melt technique. In the foam melt technique, a substance or blowing agent, such as gaseous nitrogen, is injected under pressure into the heated composition as the heated composition exits a spray nozzle. As the nitrogen and hot melt composition blend exits the spray nozzle, the nitrogen forms bubbles that remain when the hot melt composition cools and hardens, thereby producing foam or bubbles 16 supported by the cooled foamed composition. A suitable foam melt system for use in the present invention is commercially available from Nordson, though various other foam melt systems may be employed without departing from the scope of the present invention.

Another exemplary foaming method involves dissolving the foamed composition in a liquid that boils at a low temperature, such as a HFC or liquid hydrofluorocarbon. An exemplary HFC for use with the present invention includes Enovate® (HFC-245fa, 1,1,1,3,3,-pentafluoropropane). Once the composition and the liquid have been blended, they are dispensed from a pressurized container. The liquid then boils below or about room temperature and causes the composition to foam after application to the substrate 12. The composition 10 may be applied to a discontinuity on the substrate 12 in the form of a bead, line, or dot, so long as the area that is desired to be sealed is at least partially covered by the composition.

Next, the composition 10 is cured using a radiation source. The radiation source, as noted above, may include UV or near-UV radiation from a UV light such as a UV lamp. However, it should be appreciated that other radiation curing sources may be used to cure the foamed composition 10 as long as the desired cure is achieved.

Foaming of the composition 10 allows the gasketing materials to be softer and more compliant, thus offering better sealing properties between the substrate 12 as the more deviation between the substrate 12 to be mated, the greater the need for compliant gaskets or seals. Also, foaming reduces the cost of the gasket by reducing the amount of composition 10 required to seal a given application. Finally, foaming the composition 10 prior to application to the substrate 12 eliminates the need to heat the composition 10 in order to expand the composition 10 to provide an effective seal.

The composition offers an advantage over prior art moisture cure polymers which are typically used for this application and which must be cured for 4 hours or more. The composition of the present invention may be cured very quickly and provides immediate strength once cured. Additionally, by using a foamed composition, the placement of the gasket can be automated since the foaming allows for greater leeway in placement of the composition 10 and the radiation curing method facilitates faster processing.

The description of the invention is merely exemplary in nature and variations that do not depart from the gist of the invention are intended to be within the scope of the invention. Such variations are not to be regarded as a departure from the spirit and scope of the invention.

The invention claimed is:

1. An article adapted to seal to a substrate, the article comprising:
    a composition comprising a radiation curable rubber, a photoinitiator, a styrene-ethylene/butylene block copolymer, a light mineral oil, a rheology modifier, a tackifier, and at least one of a radiation curable monomer and radiation curable oligomer; and
    a blowing agent blended with the composition prior to application on the substrate.

2. The article of claim 1 wherein the radiation curable rubber comprises a styrene-butadiene-styrene block copolymer.

3. The article of claim 2 wherein the radiation curable rubber is curable by ultra-violet radiation.

4. The article of claim 3 wherein the blowing agent is gaseous nitrogen.

5. The article of claim 3 wherein the blowing agent is a hydrofluorocarbon.

6. The article of claim 4 wherein one of the radiation curable monomer and radiation curable oligomer is a polybutadiene diacrylate.

7. The article of claim 6 wherein the rheology modifier is fumed silica.

8. The article of claim 7 further comprising one or more fillers, pigments, antioxidants, and wetting agents.

9. A foamed composition adapted to seal to a substrate, the foamed composition comprising:
    from about 10 to 25% of a radiation curable styrene-butadiene-styrene block copolymer, from about 40 to 75% by weight of a mineral oil, from about 1 to 10% by weight of a tackifier, from about 10 to 25% by weight of a styrene-isoprene-styrene block copolymer, from about 1 to 3% by weight of a fumed silica, from about 0.5 to 1.5% by weight of a photoinitiator, and from about 1 to 3% by weight of a polybutadiene diacrylate.

10. A method for sealing a composition to a substrate comprising the steps of:
    mixing a composition with a blowing agent, the composition comprising a radiation curable rubber, a photoinitiator, a blowing agent, a styrene-ethylene/butylene block copolymer, a light mineral oil, a rheology modifier, a tackifier, and one of a radiation curable monomer and radiation curable oligomer;
    applying the mixed composition and blowing agent to a substrate; and
    curing the mixed composition and blowing agent with a radiation source after the mixed composition and blowing agent has foamed on the substrate.

11. The method of claim 10 wherein the step of curing the mixed composition and blowing agent includes curing the mixed composition and blowing agent with ultra-violet radiation.

12. The method of claim 10 wherein mixing the composition with the blowing agent includes mixing the composition with nitrogen.

13. The method of claim 10 wherein mixing the composition with the blowing agent includes mixing the composition with a hydrofluorocarbon.

* * * * *